(12) United States Patent
Slat

(10) Patent No.: US 6,413,600 B1
(45) Date of Patent: *Jul. 2, 2002

(54) MULTI-LAYER CONTAINER AND PREFORM AND PROCESS FOR OBTAINING SAME

(75) Inventor: William A. Slat, Brooklyn, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,992

(22) Filed: Oct. 27, 1999

Related U.S. Application Data

(63) Continuation-in-part of application No. 09/203,302, filed on Dec. 1, 1998, now Pat. No. 6,217,959, which is a continuation-in-part of application No. 08/861,477, filed on May 22, 1997, now abandoned.

(51) Int. Cl.[7] .......................... B29D 22/00; B29C 71/02
(52) U.S. Cl. ................ 428/35.7; 428/36.91; 428/542.8; 215/12.1; 215/12.2; 264/515; 264/521
(58) Field of Search ............................ 428/35.7, 36.91, 428/542.8, 36.7, 36.6; 264/513, 515, 521; 215/12.1, 12.2

(56) References Cited

U.S. PATENT DOCUMENTS

| 4,818,575 A | * | 4/1989 | Hirata et al. ................ 428/36.7 |
| 4,889,247 A | * | 12/1989 | Collette et al. ................ 215/42 |
| 5,443,766 A | * | 8/1995 | Slat et al. ...................... 264/37 |
| 6,214,281 B1 | * | 4/2001 | Slat ............................. 264/513 |

FOREIGN PATENT DOCUMENTS

WO    WO 97/02939    * 1/1997

* cited by examiner

Primary Examiner—Rena L. Dye
(74) Attorney, Agent, or Firm—Bachman & LaPointe, P.C.

(57) ABSTRACT

A multi-layer preform, includes: (a) a plastic inner liner, comprised of a cylindrical walled body, which may or may not include a tapered annular shoulder portion, and a cylindrical walled neck portion extending upwardly from the body, and (b) a molded outer layer. Prior to the outer layer being molded over the plastic inner liner, at least a portion of the liner is crystallized by a heat treatment process. The molded outer layer may include a means to receive a closure device. When the preform is at an acceptable temperature range for orientation, the multi-layer preform can be blow-molded to form a multi-layer container having improved properties.

28 Claims, 5 Drawing Sheets

MULTI-LAYER CONTAINER AND PREFORM AND PROCESS FOR OBTAINING SAME

CROSS-REFERENCE TO RELATED APPLICATIONS

This application is a Continuation-In-Part of U.S. patent application Ser. No. 09/203,302, filed Dec. 1, 1998, By William A. Slat now U.S. Pat. No. 6,217,959, which in turn is a Continuation-In-Part of U.S. patent application Ser. No. 08/861,477, filed May 22, 1997, By William A. Slat now abandoned.

TECHNICAL FIELD

This invention is directed toward containers and container preforms, and more particularly to multi-layer containers and preforms having improved physical properties.

BACKGROUND ART

In recent years, plastics have become widely used in the field of containers for food products, beverages, cosmetics, and for numerous other applications. Polyester resins, such as polyethylene terephthalate ("PET"), have become very popular because they can be blow molded into thin-walled containers having excellent physical properties and characteristics.

Conventional blow molding of plastic containers typically involves two steps. In the first step or phase, an intermediate article, or preform, is formed. The second phase involves biaxially orienting the preform into the final article by a process commonly referred to as blow molding, or stretch blow molding. Many of the properties of the plastic material are best realized once the container has been biaxially oriented and blow molded. Quite commonly during such processing, the neck portion of the preform is used as a mounting portion for the blowing mold and the finish or threaded area of the preform is not specifically heated. Also, because that segment of the preform is not fully oriented, it will not exhibit the full benefit of properties resulting from the biaxial blow molding method. For instance, PET containers in which the neck region has not been subjected to, or more fully subjected to, an orientation often exhibit reduced thermal resistance to deformation.

While the previously mentioned two-step process is frequently used to produce large volumes of containers for a variety of applications, in a number of specialized applications, the product content must be filled at elevated temperatures to ensure proper sterilization. For instance, beverages which are pasteurized, such as some European drinks, are bottled in a range of 148° to 170° F. Drinks which include a portion of fruit juice are typically hot-filled in a range of 170–185° F. Moreover, some fruit drinks and the like, require even higher hot-fill temperatures, i.e., 190° to 200° F. and above, to achieve an appropriate level of purification.

Elevated filling temperatures pose a challenge in constructing plastic containers because thermoplastic materials are known to increase in plasticity with temperature over time. Exposure of the container to the contents at higher fill temperatures can cause portions of the article to soften and deform, making it more difficult to maintain the container's structural integrity. This is especially true when longer periods of time are involved and/or when the temperature of the hot-fill product exceeds the glass transition temperature of the plastic, i.e., the temperature at which plastic changes from a solid to a soft, rubbery state. For reference, the glass transition ("$T_g$") or softening temperature of PET is approximately 170° F.

When the filling temperature approaches or exceeds transition temperature of the polymer, container manufacturers often employ additional thermal conditioning techniques to help avoid the associated thermal shrinkage and resulting distortion. In a number of applications, it becomes necessary to stiffen specific portions of the container to prevent an unacceptable amount of deformation. This is especially true for the neck region when hot-filling product contents at about 185° to 200° F. or higher, or when causing a closure roll-on die or a lugged neck finish to apply a closure means to the final container.

In the case of PET containers, non-discriminate heat treating of the entire container would induce spherulitic crystal growth in non-molecularly oriented portions of the container. The resulting container would have opaque, brittle portions, and would be commercially undesirable. As such, controlling the crystallization process is a basic consideration in determining the physical properties of the container.

The prior art discloses the practice of incorporating a heat treatment process to stiffen the neck section of preforms and/or containers. Essentially, heat treatment is used to induce crystallization at the neck portion of the preform or container in an effort to increase thermal resistance to deformation. The primary drawback with such methods is that it generally takes a significant amount of time to sufficiently heat treat the thickness of the neck portion, it being one of the thickest portions of the preform. Because this process can be costly and time-consuming, there exists a need to develop techniques for improving the properties of the upper, or neck, portion of preforms and the resultant containers in a more commercially efficient manner.

In addition to heat treating processes, manufacturers of plastic containers often attempt to take advantage of the use of multiple layers of plastic materials. Such multi-layer containers, i.e., those having multiple layers throughout all or portions of the article, often prove to be more desirable than their mono-layer counterparts for a number of hot-fill applications. This is often because the individual layers of a multi-layer structure may provide independent benefits and the layers can be selected from materials to better optimize functional characteristics. Multi-layer containers have found an increasing role in the manufacture of plastic containers and are commonly known to those skilled in the art.

Therefore, by employing processes which take advantage of both the multi-layered structure along with limited and controlled crystallization, one skilled in the art can best adapt the physical structure of the container to meet the needs of a given application.

DISCLOSURE OF INVENTION

Accordingly, an object of this invention is to provide a multi-layer preform and container made therefrom and process for obtaining same in which the neck portion is partially crystallized to enhance the mechanical strength and thermal resistance of the article.

Another object of the present invention is to provide a multi-layer preform and container made therefrom and process as aforesaid in which the neck portion of the preform has an at least partially crystallized liner which provides sufficient hardness and is produced in a more commercially efficient manner, especially with a relatively thin liner.

A further object of the present invention is to provide a multi-layer preform and container made therefrom and process as aforesaid with reduced deterioration in the physical properties of the neck portion and wherein the resultant container is better suited for specialized applications.

Still another object of the present invention is to provide a multi-layer preform and container made therefrom and process as aforesaid wherein the resultant container can withstand filling at higher temperatures without excessive deformation and may better receive a closure device.

The present invention provides a multi-layered plastic preform for manufacturing a blow molded container, comprising a plastic inner liner having a thickness from 10 to 30 mils and having a cylindrical walled lower portion and a cylindrical walled upper portion integral with and extending upwardly from said lower portion, wherein at least a portion of said upper portion of the plastic inner liner is crystallized by a heat treatment process; and an injection molded outer layer that is continuous with substantially the entire length of the plastic inner liner, wherein said preform has a closed bottom and an open neck and wherein the inner liner is crystallized separately from and prior to injection molding of the outer layer.

The present invention also provides a container blow molded from a multi-layered preform, comprising: a plastic inner liner having a thickness from 10 to 30 mils and having a cylindrical walled lower portion and a cylindrical walled upper portion integral with and extending upwardly from said lower portion, wherein at least a portion of said upper portion of the plastic inner liner is crystallized by a heat treatment process; and an injection molded outer layer that is continuous with substantially the entire length of the plastic inner liner, wherein said preform has a closed bottom and an open neck and wherein the inner liner is crystallized separately from and prior to injection molding of the outer layer.

In addition to the foregoing, the present invention also provides a process which comprises: preparing a plastic inner liner having a thickness from 10 to 30 mils and having a cylindrical walled lower portion and a cylindrical walled upper portion integral with and extending upwardly from said lower portion; crystallizing at least a portion of the upper portion of the plastic inner liner by a heat treatment process; and forming a preform by injection molding an outer layer over the plastic inner layer subsequent to crystallization of the upper portion of the liner, with the outer layer being contiguous with substantially the entire length of the inner liner and with said preform having a closed bottom and open neck. The process also includes the step of blow molding the preform to form a blow molded container.

The objects, features and advantages of the present invention are readily apparent to those skilled in the art from the following detailed description of the best modes for carrying out the invention when taken in connection with the following drawings wherein like reference characters depict like elements.

BEST MODE FOR CARRYING OUT THE INVENTION

Figure 1:
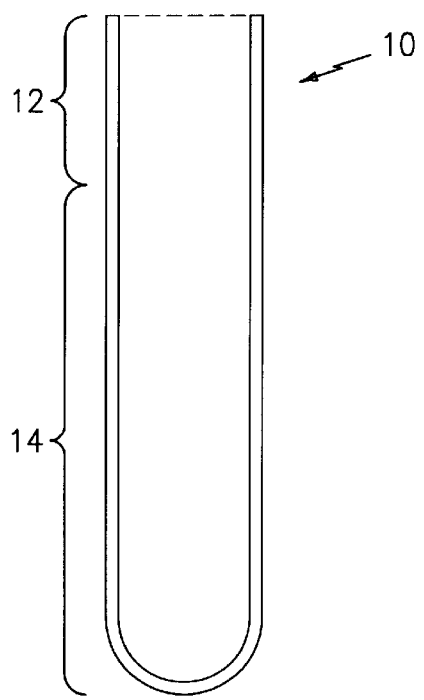
FIG. 1 is an elevational sectional view of a mono-layer plastic liner.

Referring now to the drawings in detail, wherein like reference numerals and letter designate like elements, there is shown in FIG. 1 an elevational view of a single- or mono-layer liner, also referred to as a preform sleeve, designated generally as 10. The liner 10 further includes an upper portion 12 and a lower portion 14, the lengths of which can each be adjusted to meet the needs of a given application. The upper portion 12 of the liner 10 is desirably thin, ranging from 0.010–0.30 mils, since this portion will be separately crystallized and more rapid crystallization can be obtained with a thin upper portion. For most applications, the length of the upper portion 12 should be approximately the length of the threaded portion of the preform which while eventually be used to form the desired finished article. The liner 10 itself can be formed from any number of polyester materials, such as PET, polyethylene napthalate (PEN), ethyl vinyl alcohol (EVOH) and/or various blends of the same. However, in the majority of cases, particularly those in which the finished article will hold contents fit for human consumption, the liner 10 will be formed from virgin PET or some other FDA-approved resin.

The liner 10 may be formed by an extrusion process, such as that disclosed in U.S. Pat. No. 5,464,106, by a thermoforming process, such as that taught by U.S. Pat. No. 5,443,766, by an injection molding process, by a compression molding process, or any other conventional process. However, for most containers extrusion is the preferred processing technique for forming a thin-walled liner 10 having a controlled wall thickness along its length.

Figure 2:
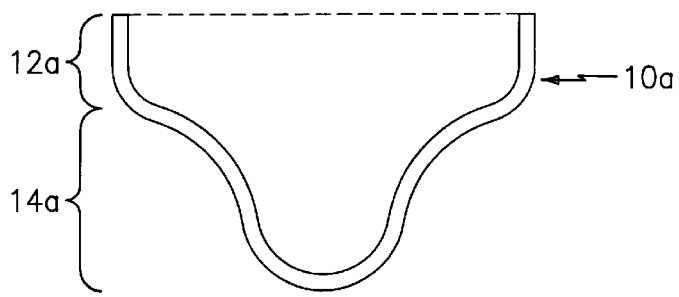
FIG. 2 is an elevational sectional view of another embodiment of a mono-layered plastic liner which is more generally suited for containers having wider mouth openings.

In FIG. 2, another embodiment of a mono-layer liner is shown. In that figure, the wide-mouth liner 10a has a larger mouth or opening diameter relative to the diameter of the finished article than the same comparative measurements of the liner 10 of FIG. 1. However, the wide-mouth liner 10a is preferably formed by thermoforming, injection or compression processes, rather than by an extrusion process.

Figure 3:
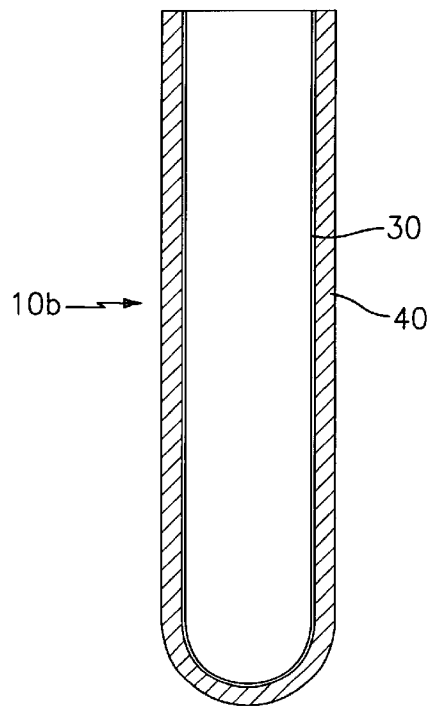
FIG. 3 is an elevational sectional view of a multi-layer plastic liner.

Referring now to FIG. 3, a multi-layered liner 10b is shown which is comprised of an inner layer 30 and an outer layer 40. When producing containers designed to hold contents for human consumption, the inner layer 30 is comprised of a polyester material which is acceptable for such a purpose. The outer layer generally will not contact the contents and generally can be comprised of less expensive polyester resins. In practice, the multi-layered liner 10b is not limited to just an inner and outer layer and can consist of any number of multiple layers taken along cross sections of all or a portion of its length. Because it is often desirable to form a thin inner or barrier layer, the liner 10b will preferably be formed by an extrusion or co-extrusion process. However, injection molding, compression molding, or other processes known in the art can be employed in various combinations to produce a similar multilayered structure.

Figure 4:
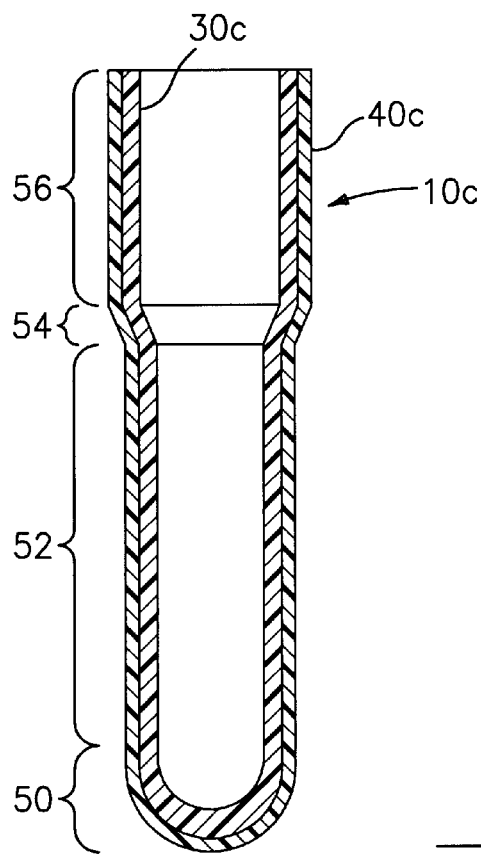
FIG. 4 is an elevational sectional view of another embodiment of a multi-layered plastic liner which includes a tapered walled shoulder and a defined upper portion.

Another embodiment of a multi-layered liner 10c is shown in FIG. 4. The multi-layered liner 10c in the drawing includes multiple layers having a lower closed portion 50, a side wall portion 52, a tapered cylindrical wall-shaped shoulder portion 54, and an upper portion 56 located above the shoulder portion 54. As long as the liner 10c can be properly transported and handled on core pins or other handling means, the precise shape and taper of the shoulder portion 54 is not critical.

The properties of polymers are dramatically affected and primarily determined by molecular structure. In general, polymers are classified as either crystalline (actually semi-crystalline) or amorphous. The ordered, three-dimensional arrangement of molecules results in crystallinity. It is important to note that polymers invariably contain a proportion of amorphous material, i.e., that which is "without form" and lacking an internal skeleton or structure. As such, polymers have varying degrees of crystallinity.

Percent crystallinity of a polyester material can be given by the following formula:

$$\% \text{ CRYSTALLINITY} = (d_s - d_a)/(d_c - d_a) \times 100,$$

where, $d_s$=density of the test sample in g/cm$^3$;

$d_a$=density of an amorphous film in zero percent crystallinity (for PET, 1.333 g/cm$^3$; and $d_c$=density of the crystal calculated from unit cell parameters (for PET, 1.455 g/cm$^3$)

Density measurements for the foregoing formula are made by the density gradient method described by given standards, more particularly ASTM 1.505.

The amount of percent of crystallinity has a significant effect upon the properties of a given polyester material. Also an increased degree of crystallinity raises the melting point, increases density, and generally improves mechanical properties. The crystallization of bulk polymers, such as PET, is characterized by the formation of large crystalline aggregates, or spherulites. However, increased crystallinity also generally lowers impact strength, solubility, and optical clarity. Because the molecular chains are only partly ordered, most crystalline plastics are not transparent in the solid state. Such crystalline structures within the polymers act to scatter light and give polyethylene and polypropylene a milky appearance. In contrast, polymers are transparent if most crystallinity can be prevented.

The amount of crystallinity achievable in a heat treated article is a function primarily of the heat treatment. By strategically controlling and directing the amount of crystallization at various portions of a plastic article, the physical characteristics can be better tailored to a given function. Depending upon the material employed and the desired crystallinity, heat treatment temperatures may range from the upper end of the orientation temperature range to in excess of 450° F. (232.2° C.). As the intrinsic viscosity of the polyester increases, the temperature needed to achieve a given percent crystallinity will also increase. Because of the foregoing factors, the heat treatment times for a given liner 10 can vary from a second or two to several minutes. The thin liner of the present invention enables more rapid heat treatment times while still obtaining significantly improved properties.

To impart controlled crystallization, some time after the liners 10 (such as those shown in FIGS. 1–4) are formed, a means for heating and crystallizing at least a portion of the liners 10 is employed. The crystallization of the specified portions of the liner 10 may be effected by heating in an oven with a thermal source or heat-generator such as an infrared heater or block of heaters, by utilizing radio frequency heating techniques, or by any other process known to those in the art. For reference, the crystallinity of the specified heat treated upper portion 12 of a PET liner 10 will be preferably between 5 and 50%, and more preferably between 20 and 45%.

Figure 5:
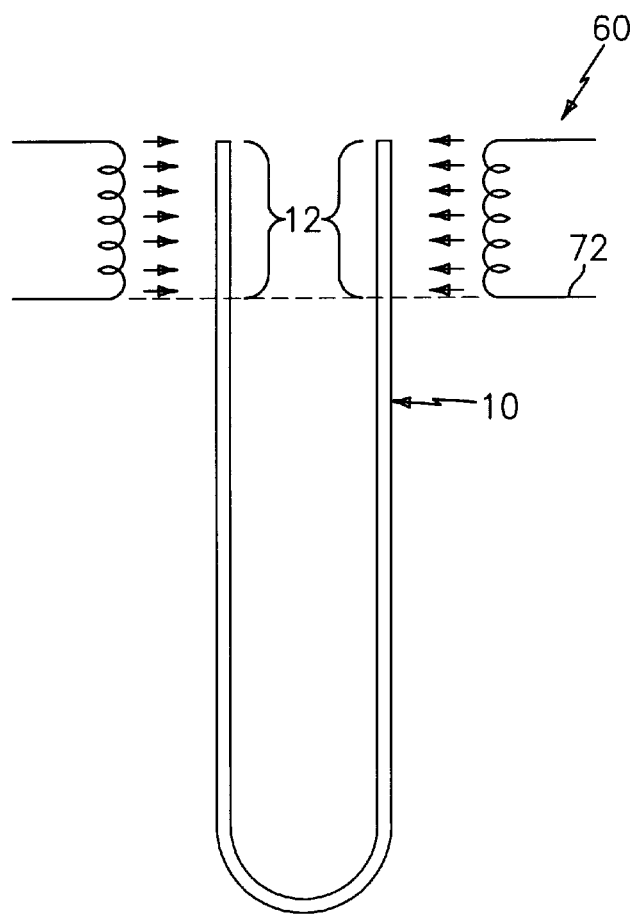
FIG. 5 is a cross-sectional view of the top end of a preform liner being subjected to a heat treatment process.
Figure 6:
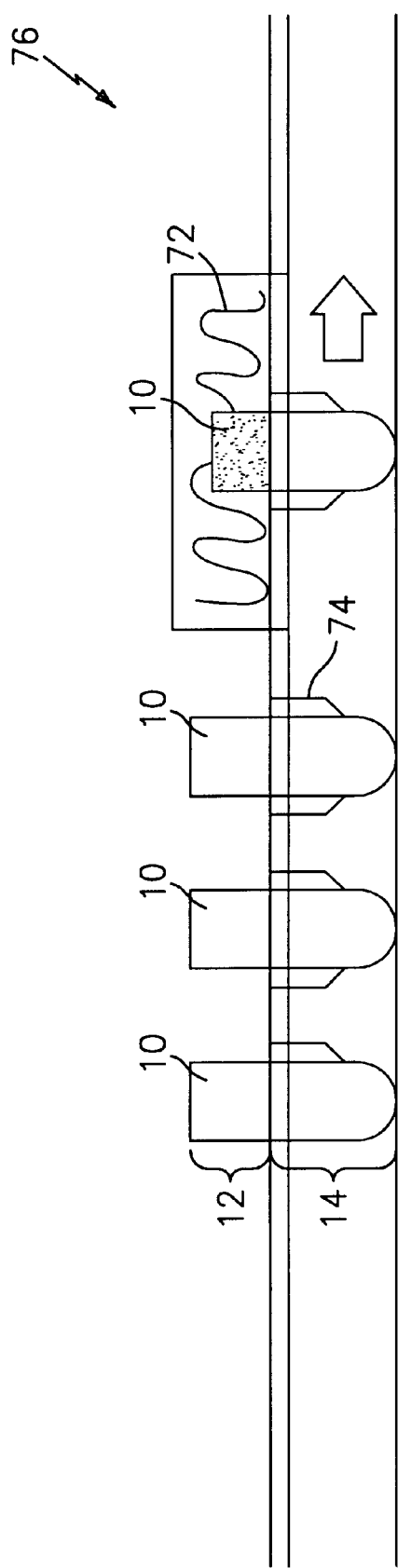
FIG. 6 is a view of one possible method for heating and handling liners.

FIG. 5 shows one form of heating means 60 being used to crystallize a portion of the upper portion 12 of a generally straight-walled, mono-layered liner 10. In the embodiment exemplified in FIG. 5, a heater 72 comprising an electromagnetic inductor is provided in a frame wall (not shown) in such a manner that radiant heat is concentrated on just the desired upper portion 12 of the liner 10. As shown in greater detail in FIG. 6, this operation can be accomplished while the liners 10 are being transported to a subsequent station and are being rotated past one or more banks of heaters 72. In the embodiment exemplified in FIG. 5, the liners 10 will be transported by rows in recesses 74, or "pockets", which cover the lower portion 14 of the liners and leave the desired upper portion 12 of the liners 10 exposed for heat treatment and crystallization as the liners are rotated at a constant speed and transported past one or more heaters 72 which may be located on one or both sides of the liner transporting system 76, as clearly shown in FIG. 6.

The heating temperatures for the upper portion 12 of the liners 10 will generally be predetermined or adjustably programmed or controlled on the basis of the thickness, contour and the like of the liner 10 being conditioned, with the thin liners of the present invention facilitating rapid processing. Additionally, by spinning or revolving the liners 10 past the heaters 72, a more uniform heat distribution can be imparted on the desired portion of the liner 10. If heated at a sufficient temperature for a sufficient duration of time, the desired portion of the liner 10 will become crystallized and may take on a milky white opaque appearance. Naturally, any of the liners in FIGS. 1–4 may be so treated.

Because the upper portion 12 of the liner 10 may undergo thermal shrinkage deformation from the heat treatment, for some applications, additional techniques may be employed to reduce the amount of thermal deformation and better maintain dimensional stability. For example, one such method involves the insertion of a die pin (not shown), or similar holding device, into the open portion of the upper portion 12 of the liner to prevent inward deformation during heat treatment. The die pin or other holding device may preferably have a cylindrical shape slightly smaller than the bore of the open upper portion 12 of the liner 10 prior to heat treatment, as well as a tapered tip to facilitate its removal from the liner 10.

However, the invention is not limited to the heating and handling means described above, and any conventional means to impart or direct a sufficient amount of heat to the desired portion of the liner 10, may be employed to specifically crystallize and thermally treat the desired segment of the liner 10. Because the walls of the liner 10 being heat treated are much less thick that the walls of the preform, as little as one-fifth the thickness or less, the heat treatment process will correspondingly take much less time than it would to treat a thicker preform, thereby resulting in processing efficiencies. Furthermore, the heat-treated liners 10 can be formed and stored until needed for further processing.

Figure 7:
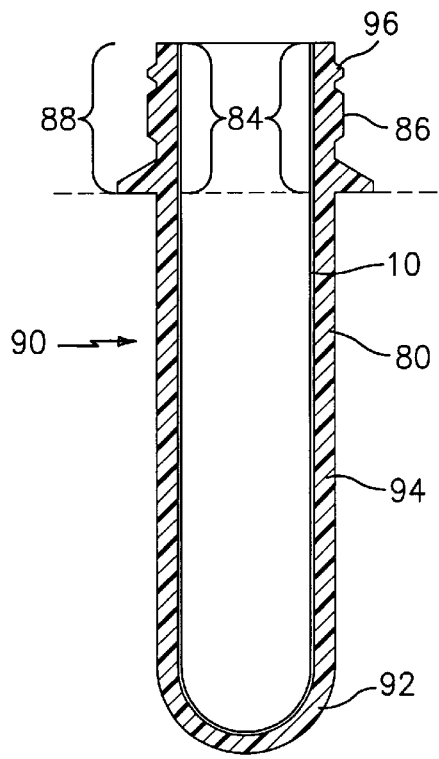
FIG. 7 is an elevational sectional view of a preform in which a portion of the liner has been subjected to a heat treatment process and an outer layer, including a threaded portion, has been molded over the liner.

Reference is next made to FIG. 7. After the desired portions of the liner 10, or any of the liners in FIGS. 1–4, have been sufficiently heat treated and crystallized, an outer layer 80 of a thermoplastic polyester is molded around the liner 10 to form a multi-layered preform 90. In the preform 90 shown in FIG. 7, the crystallized segment of the liner 10 is designated by the number 84. While various molding processes, including compression molding, may be used to form the outer layer 80, the preferred method is injection molding. The crystallized liner 10 is placed in the cavity of a conventional injection mold and the outer layer 80 is subsequently injection molded around the liner 10 as shown in FIG. 7 to form the preform 90. Additionally, for most applications the outer layer 80 of the preform 90 includes a means for securing a closure device. Most commonly, threads 86 are injection molded into the neck finish of the outer layer 80 of the preform 90 and are designed to accept a screw-type cap. Although it is not viewed as a requirement, for certain applications, the upper dispensing end 88 of the preform 90 can additionally be subjected to a secondary heat treatment or heat-setting process to stiffen the outer molded layer adjacent the inner plastic liner. Such secondary heat treatment can be accomplished by any of several conventional techniques for stiffening the neck of a preform which are well-known in the art. Thus, as shown in FIG. 7, outer layer 80 includes closed bottom, body portion 94 extending upwardly therefrom and threaded neck portion 96 extending upwardly from body portion 94. The body portion of the outer layer and the cylindrical walled lower portion of the liner in combination have a thickness from 110 to 170 mils, preferably from 145 to 150 mils.

With the configuration taught by this invention, a multi-layered preform 90 can be formed to incorporate advantages associated with different layers and materials having varied levels of crystallization along different portions of their vertical lengths. For instance, the upper portion 12 of the liner 10, such as that corresponding and adjacent to the relatively unoriented portion of the molded outer layer 80, can be heat treated as desired to impart a given range of crystallinity thereby providing certain inherent characteristics, such as increased thermal stability and improved mechanical properties. Surprisingly, despite the thin liner, the improved properties in the upper liner provides greatly improved properties in the preform and resultant container with rapid processing. At the same time, the corresponding portion of the molded outer layer 80 of the preform 90, which is not directly heat treated to induce or increase crystallization, will provide other desirable physical characteristics such as higher strength and better optical clarity.

Figure 8:
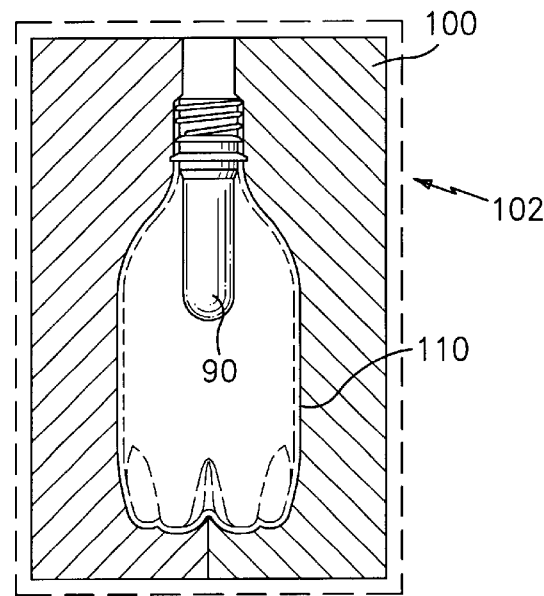
FIG. 8 is an elevational view showing the process of blow molding the preform into the container.

Once the multi-layer preform 90 has been formed and is brought to an appropriate temperature profile, if necessary by re-heating, the preform 90 can then be placed into a blow mold 100, shown in FIG. 8. In the blow mold 100, the preform 90 is held securely by an engagement of the mold with at least a portion of the upper dispensing end 88 of the preform 90. Once proper placement is established, the blow molder 102 is used to blow the preform 90 into the final shape of the container. The portion of the preform 90 secured by the mold, including the corresponding portions of the plastic inner liner 10 which have been heat treated and the molded outer layer 80, will not experience the full biaxial orientation imparted by the blow molding process. Hence, such sections of the respective layers will have slightly different physical characteristics than the portions of the same layers which were secured during the blow molding process.

For a PET container 110, the density of the non-secured, biaxially oriented (strain crystallized only) transparent region will be generally below 1.36 grams/cc, whereas the density of the thermal and strain crystallized finish region will be substantially above 1.37 grams/cc. Thus, for example, the oriented, transparent regions will have a crystallinity below 22% while the crystallized regions will have a crystallinity above 30%.

Figure 9:
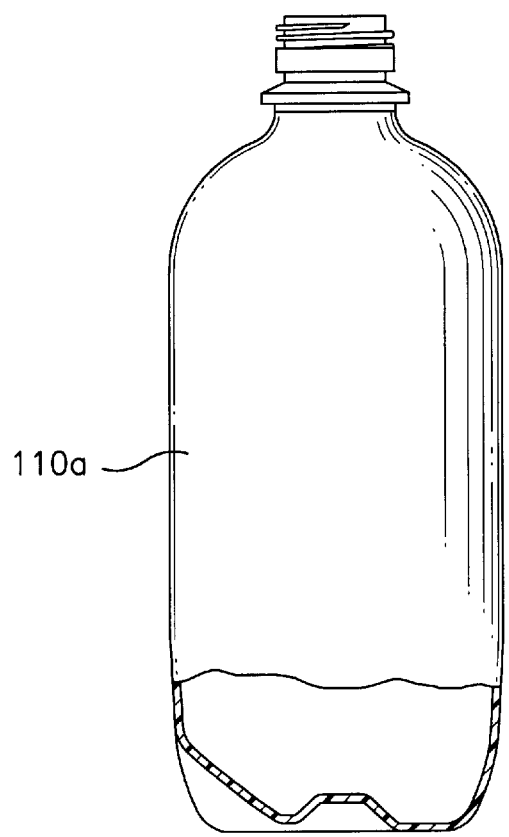
FIG. 9 is an elevational view of one type of container made in accordance with the principles of the present invention.
Figure 10:
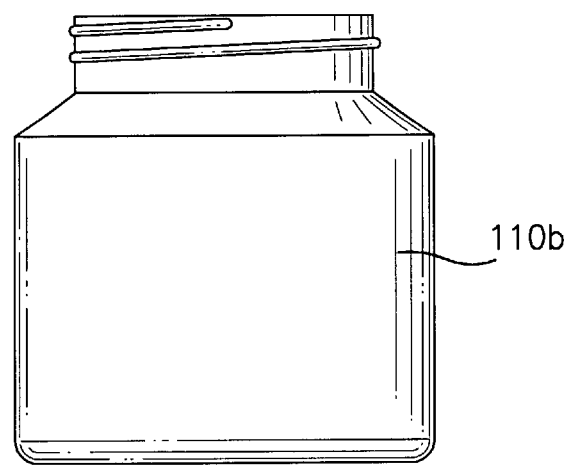
FIG. 10 is an elevational view of another type of container having a wider mouth opening which is made in accordance with the principles of the present invention.

After the preform 90 is formed into the container, the blow mold 100 is opened and the completed container 110 is removed. FIGS. 9 and 10 show two styles of containers, respectively designated 110$a$ and 110$b$, which can be produced utilizing the principles of the instant invention. However, an unlimited number of designs can be contemplated.

Although the above description contains many specific references to detailed information, such specificity should not be construed as limiting the scope of the invention, but as merely providing an illustration of some of the presently preferred embodiments of the invention. Obviously, numerous modifications and variations of the present invention are possible in light of the above teachings. It is therefore understood that the invention may be practiced other than as specifically described herein and the scope of the invention should be determined by the appended claims and their legal equivalents, rather than by the examples given.

What is claimed is:

1. A multi-layered plastic preform for manufacturing a blow molded container, comprising:
    a plastic inner liner having a thickness from 10 to 30 mils and having a cylindrical walled lower portion and a cylindrical walled upper portion integral with and extending upwardly from said lower portion, wherein at least a portion of said upper portion only of the plastic inner liner is crystallized by a heat treatment process; and
    an injection molded outer layer that is continuous with substantially the entire length of the plastic inner liner, wherein said preform has a closed bottom and an open neck and wherein at least a portion of the upper portion only of the inner liner is crystallized separately from and prior to injection molding of the outer layer, and wherein said inner liner is an innermost layer.

2. The preform of claim 1, wherein the plastic inner liner is extrusion blow-molded.

3. The preform of claim 1, wherein the outer layer has a closed bottom, a body portion extending upwardly therefrom and a threaded neck portion extending upwardly therefrom, wherein the body portion and cylindrical walled lower portion of the liner in combination have a thickness from 110 to 170 mils.

4. The preform of claim 1, wherein the plastic inner liner is thermoformed.

5. The preform of claim 1, wherein the majority of the upper portion of the plastic inner liner is in the heat treated condition and is in a crystallized state.

6. The preform of claim 1, wherein the upper portion of the plastic inner liner has an outer surface area and wherein greater than 20% of the total outer surface area of the plastic inner liner is in the heat treated condition and is in a crystallized state.

7. The preform of claim 1, wherein the molded outer layer has an upper portion corresponding to and adjacent the inner liner upper portion, and wherein said outer layer upper portion includes a means to accept a closure.

8. The preform of claim 7, wherein the length of the crystallized upper portion of the plastic inner liner approximately corresponds to the length of the molded outer layer having a means to accept a closure.

9. The preform of claim 1, wherein the plastic inner liner is comprised substantially of polyethylene terephthalate.

10. The preform of claim 1, wherein the liner is comprised of a blend of plastic materials.

11. The preform of claim 10, wherein at least one of said plastic materials is polyethylene terephthalate.

12. The preform of claim 1, wherein the plastic inner liner is comprised of a plastic barrier material.

13. The preform of claim 1, wherein the plastic inner liner is multi-layered.

14. The preform of claim 13, wherein at least one layer of the plastic inner liner is a plastic barrier material.

15. The preform of claim 14, wherein the barrier material is selected from the group consisting of ethylene vinyl alcohol (EVOH), polyethylene naphthalate (PEN), or a combination thereof.

16. The preform of claim 1, wherein the molded outer layer is comprised of recycled plastic.

17. The preform of claim 1, wherein at least a portion of the molded outer layer is in the heat treated condition.

18. The preform of claim 17, wherein the outer layer heat treated condition includes heat setting.

19. The preform of claim 1, wherein said plastic inner liner includes a cylindrical walled body, and a tapered cylindrical walled shoulder extending upwardly from said body, and a cylindrical walled upper portion extending upwardly from said shoulder, wherein at least a portion of said upper portion is crystallized by a heat treatment process.

20. The preform of claim 19, wherein at least a portion of said shoulder is in a crystallized state.

21. A container blow molded from a multi-layered plastic preform, said preform comprising:

a plastic inner liner having a thickness from 10 to 30 mils and having a cylindrical walled lower portion and a cylindrical walled upper portion integral with and extending upwardly from said lower portion, wherein at least a portion only of said upper portion of the plastic inner liner is crystallized by a heat treatment process; and an injection molded outer layer that is continuous with substantially the entire length of the plastic inner liner, wherein said preform has a closed bottom and an open neck and wherein at least a portion of the upper portion only of the inner liner is crystallized separately from and prior to injection molding of the outer layer, and wherein said inner liner is an innermost layer.

22. The container of claim 21, wherein the molded outer layer has an upper portion corresponding to and adjacent the inner liner upper portion, said molded outer layer upper portion includes threads to accept a closure.

23. The container of claim 23, wherein the upper portion of the plastic inner liner and the threaded portion of the molded outer layer are substantially unoriented.

24. The container of claim 23, wherein the container includes an upper segment of an outer surface, and wherein said upper segment is in the heat treated condition.

25. The container of claim 24, wherein the container includes an upper segment of an outer surface, and wherein said upper segment of the outer surface of the container adjacent the threads is in the heat treated condition.

26. The container of claim 22, wherein the outer layer has a closed bottom, a body portion extending upwardly therefrom and a threaded neck portion extending upwardly therefrom, wherein the body portion and cylindrical walled lower portion of the liner in combination have a thickness from 110 to 170 mils.

27. The preform of claim 1, wherein said plastic inner liner includes a closed bottom integral with and beneath said cylindrical walled lower portion.

28. The container of claim 21, wherein said plastic inner liner includes a closed bottom integral with and beneath said cylindrical walled lower portion.

* * * * *

UNITED STATES PATENT AND TRADEMARK OFFICE
CERTIFICATE OF CORRECTION

PATENT NO.    : 6,413,600 B1
DATED         : July 2, 2002
INVENTOR(S)   : William A. Slat It is certified that error appears in the above-identified patent and that said Letters Patent is hereby corrected as shown below:

Column 10,
Line 15, "claim 23" should read -- claim 22 --.
Line 18, "claim 23" should read -- claim 22 --.

Signed and Sealed this

Fifteenth Day of October, 2002

Attest:

Attesting Officer

JAMES E. ROGAN
Director of the United States Patent and Trademark Office